(12) United States Patent
Clark et al.

(10) Patent No.: US 9,253,950 B1
(45) Date of Patent: Feb. 9, 2016

(54) LOW FLOW EMITTER WITH EXIT PORT CLOSURE MECHANISM FOR SUBSURFACE IRRIGATION

(71) Applicant: Hunter Industries, Inc., San Marcos, CA (US)

(72) Inventors: Michael L. Clark, San Marcos, CA (US); Daniel E. Hunter, Vista, CA (US)

(73) Assignee: Hunter Industries, Inc., San Marcos, CA (US)

( * ) Notice: Subject to any disclaimer, the term of this patent is extended or adjusted under 35 U.S.C. 154(b) by 485 days.

(21) Appl. No.: 13/644,741

(22) Filed: Oct. 4, 2012

(51) Int. Cl.
*A01G 25/02* (2006.01)
*B05B 1/30* (2006.01)
*B05B 1/32* (2006.01)

(52) U.S. Cl.
CPC ............ *A01G 25/023* (2013.01); *B05B 1/3006* (2013.01); *B05B 1/323* (2013.01)

(58) Field of Classification Search
CPC ...... A01G 25/023; B05B 1/30; B05B 1/3006; B05B 1/32; B05B 1/323
USPC .................................. 239/542, 547, 569, 570
See application file for complete search history.

(56) References Cited

U.S. PATENT DOCUMENTS

| | | | | |
|---|---|---|---|---|
| 3,876,155 A | * | 4/1975 | Ruben | 239/542 |
| 4,153,380 A | | 5/1979 | Hartman | 405/39 |
| 4,226,368 A | * | 10/1980 | Hunter | 239/542 |
| 4,613,080 A | * | 9/1986 | Benson et al. | 239/542 |
| 4,653,695 A | * | 3/1987 | Eckstein | 239/542 |
| 4,753,394 A | * | 6/1988 | Goodman | 239/542 |
| 4,796,660 A | * | 1/1989 | Bron | 137/504 |
| 5,058,806 A | | 10/1991 | Rupar | |
| 5,137,216 A | * | 8/1992 | Hanish | 239/542 |
| 5,232,160 A | * | 8/1993 | Hendrickson et al. | 239/276 |
| 5,288,022 A | | 2/1994 | Sesser | |
| 5,375,768 A | | 12/1994 | Clark | |
| 5,423,486 A | | 6/1995 | Hunter | |
| 5,456,411 A | | 10/1995 | Scott et al. | |
| 5,556,036 A | | 9/1996 | Chase | |
| 5,699,962 A | | 12/1997 | Scott et al. | |
| 5,711,486 A | | 1/1998 | Clark et al. | |
| 5,720,435 A | | 2/1998 | Hunter | |
| 5,762,270 A | | 6/1998 | Kearby et al. | |
| 5,918,812 A | | 7/1999 | Beutler | |
| 5,927,607 A | | 7/1999 | Scott | |
| 5,988,523 A | | 11/1999 | Scott | |
| 6,026,850 A | * | 2/2000 | Newton et al. | 137/505.41 |
| 6,042,021 A | | 3/2000 | Clark | |
| 6,050,502 A | | 4/2000 | Clark | |
| 6,082,632 A | | 7/2000 | Clark et al. | |
| 6,138,924 A | | 10/2000 | Hunter et al. | |

(Continued)

*Primary Examiner* — Ryan Reis
(74) *Attorney, Agent, or Firm* — Knobbe, Martens, Olson & Bear, LLP

(57) ABSTRACT

A drip emitter for subsurface irrigation includes a valve chamber defining a hollow interior, an entry port and at least one exit port. A flexible diaphragm is mounted in the hollow interior of the valve chamber for movement in response to pressurized water being supplied to the hollow interior through the entry port. The drip emitter further includes a tortuous path water flow channel that limits the flow of water from the hollow interior of the valve chamber to the at least one exit port. A closure member is moved by the flexible diaphragm to open the at least one exit port when pressurized water enters the hollow interior to allow water to be discharged through the at least one exit port. A spring moves the closure member to close the at least one exit port when the supply of pressurized water is shut OFF.

20 Claims, 15 Drawing Sheets

(56) References Cited

U.S. PATENT DOCUMENTS

| | | |
|---|---|---|
| 6,227,455 B1 | 5/2001 | Scott et al. |
| 6,241,158 B1 | 6/2001 | Clark et al. |
| 6,244,521 B1 | 6/2001 | Sesser |
| 6,299,075 B1 | 10/2001 | Koller |
| 6,457,656 B1 | 10/2002 | Scott |
| 6,491,235 B1 | 12/2002 | Scott et al. |
| 6,499,672 B1 | 12/2002 | Sesser |
| 6,568,607 B2 | 5/2003 | Boswell .................. 239/542 |
| 6,651,905 B2 | 11/2003 | Sesser et al. |
| 6,688,539 B2 | 2/2004 | Vander Griend |
| 6,695,223 B2 | 2/2004 | Beutler et al. |
| 6,736,332 B2 | 5/2004 | Sesser et al. |
| 6,817,543 B2 | 11/2004 | Clark |
| 6,854,664 B2 | 2/2005 | Smith |
| 6,871,795 B2 | 3/2005 | Anuskiewicz |
| 6,957,782 B2 | 10/2005 | Clark et al. |
| 7,032,836 B2 | 4/2006 | Sesser et al. |
| 7,040,553 B2 | 5/2006 | Clark |
| 7,159,795 B2 | 1/2007 | Sesser et al. |
| 7,240,860 B2 | 7/2007 | Griend |
| 7,287,711 B2 | 10/2007 | Crooks |
| 7,303,147 B1 | 12/2007 | Danner et al. |
| 7,322,533 B2 | 1/2008 | Grizzle |
| D593,182 S | 5/2009 | Anuskiewicz |
| 7,530,504 B1 | 5/2009 | Danner et al. |
| 7,611,077 B2 | 11/2009 | Sesser et al. |
| 7,621,467 B1 | 11/2009 | Garcia |
| 7,648,085 B2 | 1/2010 | Mavrakis et al. ............. 239/542 |
| 7,677,469 B1 | 3/2010 | Clark |
| 7,748,646 B2 | 7/2010 | Clark |
| 7,828,230 B1 | 11/2010 | Anuskiewicz et al. |
| 7,861,948 B1 | 1/2011 | Crooks |
| 8,220,723 B2 | 7/2012 | Clark |
| 8,272,578 B1 | 9/2012 | Clark et al. |
| 2005/0133619 A1 | 6/2005 | Clark |
| 2009/0224070 A1 | 9/2009 | Clark et al. |
| 2009/0261183 A1 | 10/2009 | Mavrakis et al. ............. 239/542 |
| 2010/0200676 A1* | 8/2010 | Allen et al. .................. 239/542 |
| 2011/0024522 A1 | 2/2011 | Anuskiewicz |
| 2012/0024982 A1 | 2/2012 | Dunn et al. |
| 2012/0132727 A1 | 5/2012 | Dunn et al. |
| 2012/0234940 A1 | 9/2012 | Clark |

* cited by examiner

FIG. 13A          FIG. 13B

LOW FLOW EMITTER WITH EXIT PORT CLOSURE MECHANISM FOR SUBSURFACE IRRIGATION

CROSS-REFERENCE TO RELATED APPLICATION

This application is related by subject matter to pending U.S. patent application Ser. No. 12/693,342 filed by Glendale Grizzle on Jan. 25, 2010, entitled "Soil Moisture Responsive Irrigation Flow Control Valve," which was assigned to Hunter Industries, Inc. on Apr. 30, 2010, on Reel 024319, Frame 0565.

FIELD OF THE INVENTION

The present invention relates to subsurface irrigation of landscape vegetation.

BACKGROUND OF THE INVENTION

Many areas of the world have insufficient rainfall during periods of the year to support the health of turf and landscaping. Irrigation systems are therefore employed that utilize an electronic controller to execute a watering program. The controller turns a plurality of solenoid actuated valves ON and OFF that in turn control the delivery of water to a plurality of sprinklers located around the irrigation site. The sprinklers are typically rotor-type sprinklers, rotary stream sprinklers, spray heads or micro-stream sprinklers that deliver water above the ground in various stream and spray patterns.

In some cases drip irrigation is used to deliver water at a very slow rate to individual plants, shrubs and trees. Drip emitters are used instead of sprinklers when drip irrigation is employed. A drip emitter typically includes a tortuous path water flow channel. The drip emitters may be connected to the ends of segments of small diameter plastic tube and located above the ground immediately next to plants and shrubs. The drip emitters may also be mounted inside larger diameter plastic tube at spaced apart intervals to deliver water through holes in the tube, thereby providing what the irrigation industry refers to as drip line.

Subsurface drip emitters have been developed that are more efficient in terms of saving water because there is less evaporation and runoff. They are also less subject to vandalism. See U.S. Pat. No. 7,648,085 granted Jan. 19, 2010, to Mavrakis et al. that discloses a subsurface drip emitter that can be mounted inside tubing. See U.S. Pat. No. 4,153,380 granted May 8, 1979, to Hartman that discloses a subsurface the drip emitter that is coupled to a hollow ground spike for delivering water to the roots of plants.

SUMMARY OF THE INVENTION

In accordance with the present invention, a drip emitter for subsurface irrigation includes a valve chamber defining a hollow interior, an entry port and at least one exit port. A flexible diaphragm is mounted in the hollow interior of the valve chamber for movement in response to pressurized water being supplied to the hollow interior through the entry port. A closure member is moved by the flexible diaphragm to open the at least one exit port when pressurized water enters the hollow interior to allow water to be discharged through the at least one exit port. A spring moves the closure member to close the at least one exit port when the supply of pressurized water is shut OFF.

DETAILED DESCRIPTION

The exit port of a subsurface emitter can become clogged due to grit which often enters the exit port due to back siphoning. In addition, the exit port of a subsurface drip emitter may become clogged due to the entry of insects or penetration by roots, each of which may be seeking out a source of water. The addition of external check valves is not a practical solution to the problem of grit entry and clogging due to back siphoning. The use of insecticides and herbicides to limit intrusion by insects and roots is undesirable. The present invention provides a subsurface drip emitter with a compact, non-complex, inexpensive, and reliable exit port closure mechanism that prevents the entry of grit, insects and roots.

Figure 1:
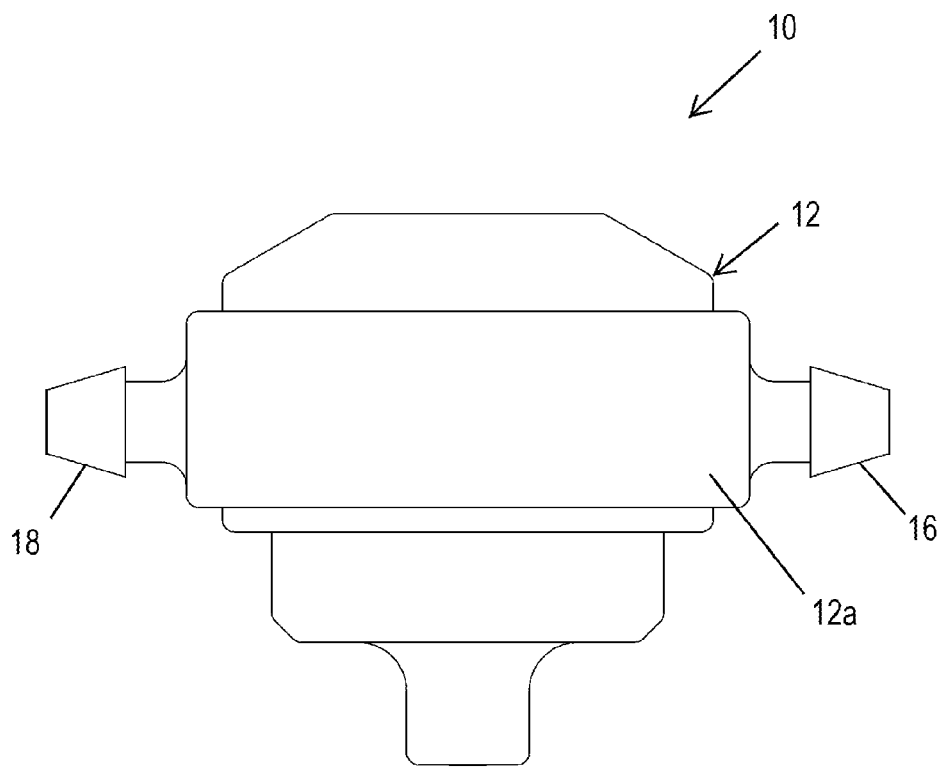
FIG. 1 is an enlarged side elevation view of a button style drip emitter in accordance with a first embodiment of the present invention.

FIG. 1 illustrates a button style drip emitter 10 in accordance with a first embodiment of the present invention. The drip emitter 10 is designed to be placed above ground, or buried in the ground near individual plants, shrubs and trees for accomplishing subsurface irrigation. Besides its stainless steel coil spring and synthetic rubber diaphragm and washer, the other parts of the drip emitter 10 are preferably made of injection molded thermoplastic such as polyethylene, polypropylene and blends thereof. The various parts of the drip emitter 10 may also be made of injection molded styrene or acrylonitrile butadiene styrene (ABS). Other plastic materials commonly used to mold irrigation parts may also be used and need not be listed herein.

Figure 2:
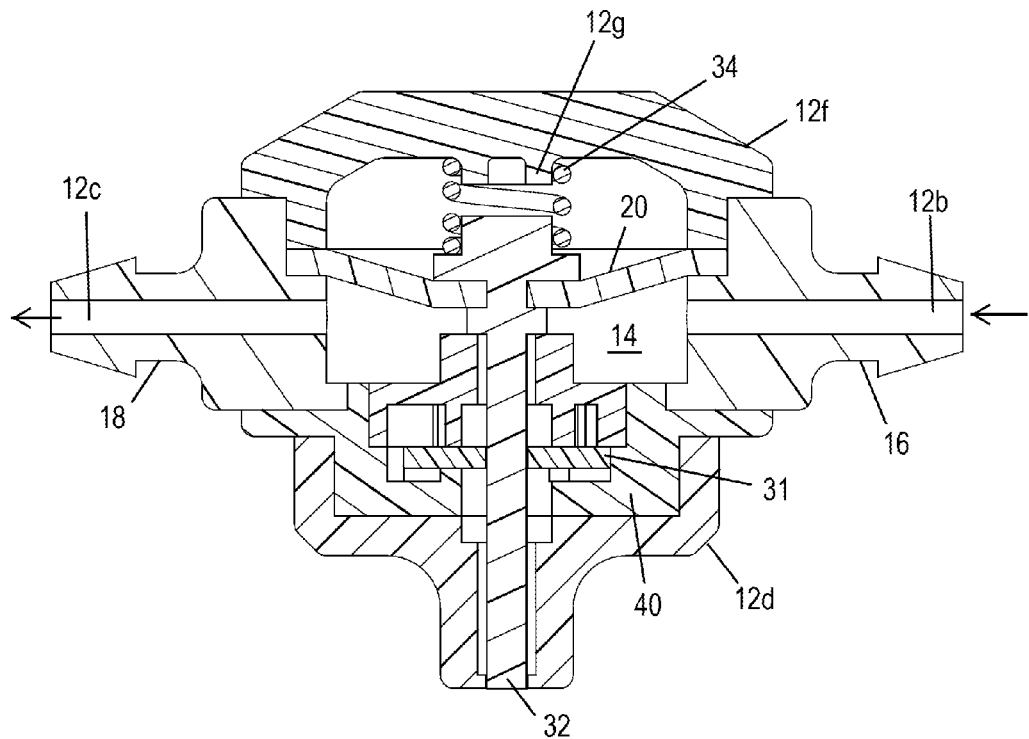
FIG. 2 is a further enlarged vertical sectional view illustrating the button style drip emitter in its CLOSED state.

The drip emitter 10 includes a generally cylindrical valve chamber 12 defining a hollow interior 14 (FIG. 2). The annular side wall 12a (FIG. 1) of the valve chamber 12 has diametrically positioned entry and exit ports 12b and 12c (FIG. 2), respectively, formed within the barbed fittings 16 and 18. The barbed fitting 16 is used for coupling a first plastic tube segment (not illustrated) to admit pressurized water from a source (not illustrated) through the entry port 12b. The barbed fitting 18 is used for coupling a second plastic tube segment (not illustrated) to deliver water from the hollow interior 14 through the exit port 12c and into the second tube segment to a downstream drip emitter (not illustrated). The direction of water flow through the barbed fittings 16 and 18 is illustrated by the arrows in FIG. 2. The inner ends of the barbed fittings 16 and 18 may be adhesively joined or sonically welded to the portions of the annular side wall 12a of the valve chamber 12 that define the entry and exit ports 12b and 12c.

Figure 3:
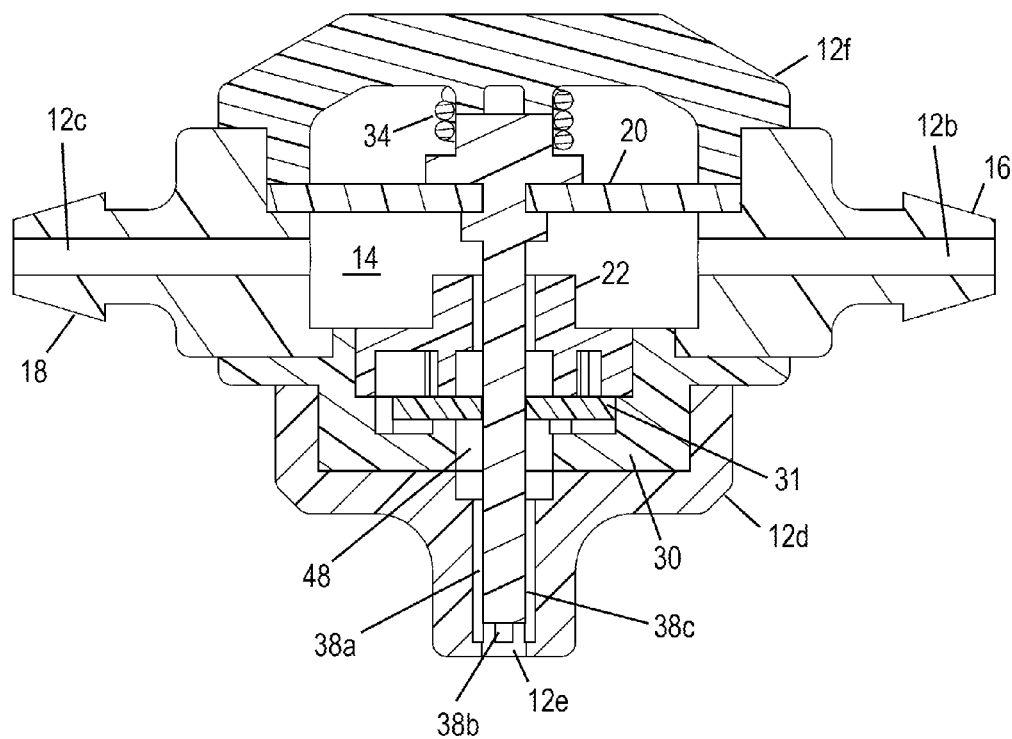
FIG. 3 is a view similar to FIG. 2 illustrating the button style drip emitter in its OPEN state.

Referring to FIG. 3, the valve chamber 12 includes a lower nipple portion 12d that defines an exit port 12e. The lower nipple portion 12d is molded as a separate piece and its annular lip is adhesively joined or sonically welded over an annular lower shoulder of the valve chamber 12. The lower nipple portion 12d thus forms a bottom wall of the valve chamber 12. The valve chamber 12 also includes a generally disc-shaped lid 12f (FIG. 2). The lid 12f is also molded as a separate piece and its annular lip is adhesively joined or sonically welded over an annular upper shoulder, or to the upper bore, of the valve chamber 12. The lid 12f may also be snap fit into the upper bore of the valve chamber 12

Figure 4:
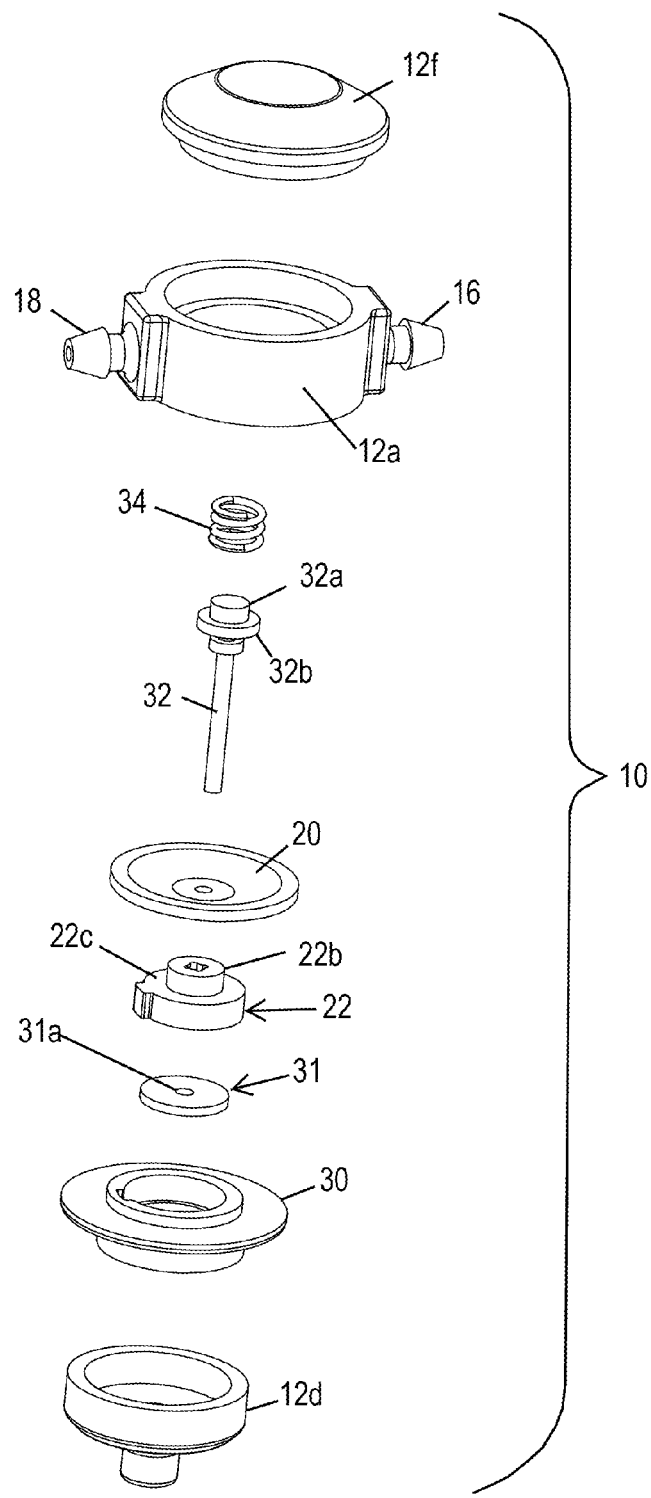
FIG. 4 is an exploded isometric view of the button style drip emitter.

A circular flexible disc-shaped diaphragm 20 (FIG. 4) is mounted in the hollow interior 14 of the valve chamber 12. A central slightly conical portion of the diaphragm 20 moves in response to pressurized water being supplied to the hollow interior 14 through the barbed fitting 16 and the entry port 12b. The diaphragm 20 is preferably made of an elastomeric material of suitable durometer such as synthetic rubber. One example of a suitable elastomer for the diaphragm 20 is sold under the trademark SANTOPRENE® and is commercially available from Exxon Mobile. The outer edge of the flexible diaphragm 20 is captured between an upper shoulder of the annular side wall 12a and the lid 12f to securely hold the diaphragm 20 in position within the valve chamber 12.

Figure 5:
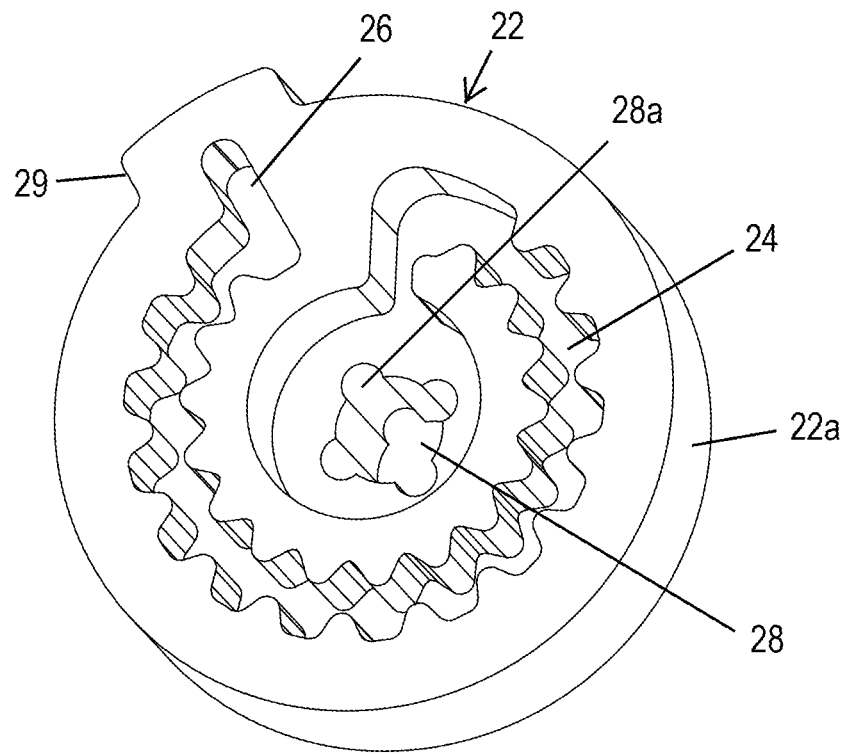
FIG. 5 is an enlarged isometric view of the tortuous path disc of the button style drip emitter taken from above.
Figure 6:
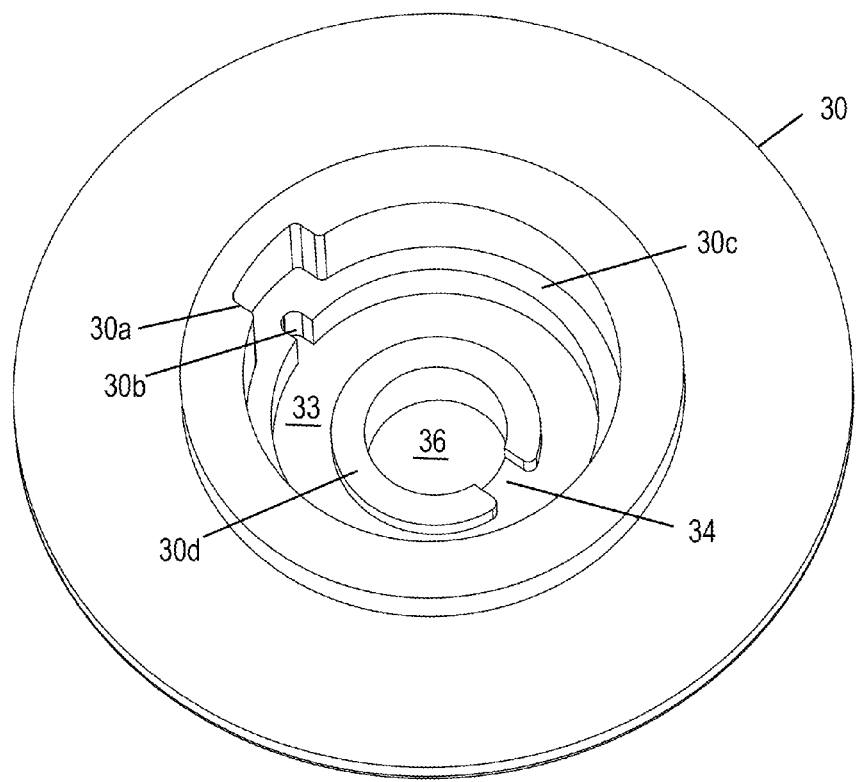
FIG. 6 is an enlarged isometric view of the base of the button style drip emitter taken from above.

A stepped flow control disc 22 (FIGS. 4 and 5) is mounted inside the hollow interior 14 of the valve chamber 12 beneath the diaphragm 20. The flow control disc 22 has a larger disc-shaped lower portion 22a (FIG. 5) that is formed with a tortuous path water flow channel 24. The flow channel 24 limits the flow of water from the hollow interior 14 of the valve chamber 12 to the exit port 12e in the lower nipple portion 12d. The flow channel 24 has a generally spiral configuration with saw-tooth shaped walls. The flow channel could have a wide variety of configurations for slowing the transit of water therethrough. Water enters the flow channel 24 through four vertical grooves 28a formed at ninety degree spaced locations around a central bore 28 in a smaller cylindrical upper portion 22b (FIG. 4) of the flow control disc 22. Water that enters through the central bore 28 exits through a peripheral slot 26 in the disc-shaped lower portion 22a. A radially extending tab 29 formed on the outer edge of the disc-shaped lower portion 22a of the flow control disc 22. The tab 29 fits in a recess 30a (FIG. 6) of a stepped circular base 30 to align the slot 26 with an exit port 30b.

The circular base 30 (FIG. 4) is seated in the nipple portion 12d and receives the disc-shaped lower portion 22a of the flow control disc 22. A flat circular washer 31 separates the flow control disc 22 and the circular base 30. The washer 31 may also be made of synthetic rubber of suitable durometer and provides a seal between the lower flat surface of the flow control disc 22 and a pair of concentric circular shoulders 30c and 30d (FIG. 6) on the upper side of the base 30. The washer 31 has a central aperture 31a. A closure member in the form of an elongated cylindrical pin 32 (FIG. 4) extends through the aperture 31a in the washer 31. The vertical wall of the washer 31 that defines the aperture 31a engages and seals against the exterior surface of the pin 32 as best seen in FIG. 2. The washer 31 prevents water from passing directly from the hollow interior 14 of the valve chamber 12 into the interior of the lower nipple portion 12d. Water exiting the slot 26 is directed into the exit port 30b in the base 30. Water continues to flow within a circular recess 33 in the base 30 and exits the circular base 30 through a gap 34 in the circular shoulder 30d. Water exiting through the gap 34 flows into a cylindrical bore 36 in the center of the circular base 30. The water then flows in the linear flow paths 38a-38c formed in the interior wall of the nipple portion 12d and along the length of the cylindrical pin 32 to the exit port 12e (FIG. 3).

When pressurized water is supplied to the hollow interior 14, the pin 32 (FIG. 2) is axially moved by the diaphragm 20 to open the exit port 12e in the nipple portion 12d. The OPEN state of the drip emitter 10 is illustrated in FIG. 3. In the OPEN state the raised position of the pin 32 permits water to be discharged through the exit port 12e into the surrounding soil for uptake by the roots of the plants being irrigated. A stainless steel coil spring 34 (FIGS. 2-4) moves the pin 32 downwardly to close the exit port 12e when the supply of pressurized water is shut OFF. The CLOSED state of the drip emitter 10 is illustrated in FIG. 2. The lower end of the coil spring 34 surrounds a cylindrical mounting hub 32a (FIG. 4) formed on the upper end of the pin 32. The lower end of the coil spring 32 pushes against a circular flange 32b also formed on the upper end of the pin 32. The upper end of the coil spring 34 surrounds a centering boss 12g (FIG. 2) formed on the underside of the lid 12f. When the drip emitter 10 is in its CLOSED state the lower end of the pin 32 seals the exit port 12e, to prevent grit, insects and roots from entering the exit port 12e and obstructing the same.

The button style drip emitter 10 can be buried in the soil or can be laid on top of the soil. In the subsurface location, the unique exit port closure mechanism will prevent the entry of grit, insects and roots into the exit port 12e. When the button style drip emitter 10 is mounted above ground, roots will not normally try to enter the exit port 12e; however, the unique exit port closure mechanism will still prevent clogging of the exit port 12e with dirt, grit and/or insects. Whether the button style drip emitter 10 is used above ground or below ground, the positive closure and sealing of the exit port 12e by the pin 32 due to the force of the coil spring 34 will push out any debris or insects that have entered the exit port 12e while the drip emitter 10 was in its OPEN state.

Figure 7:
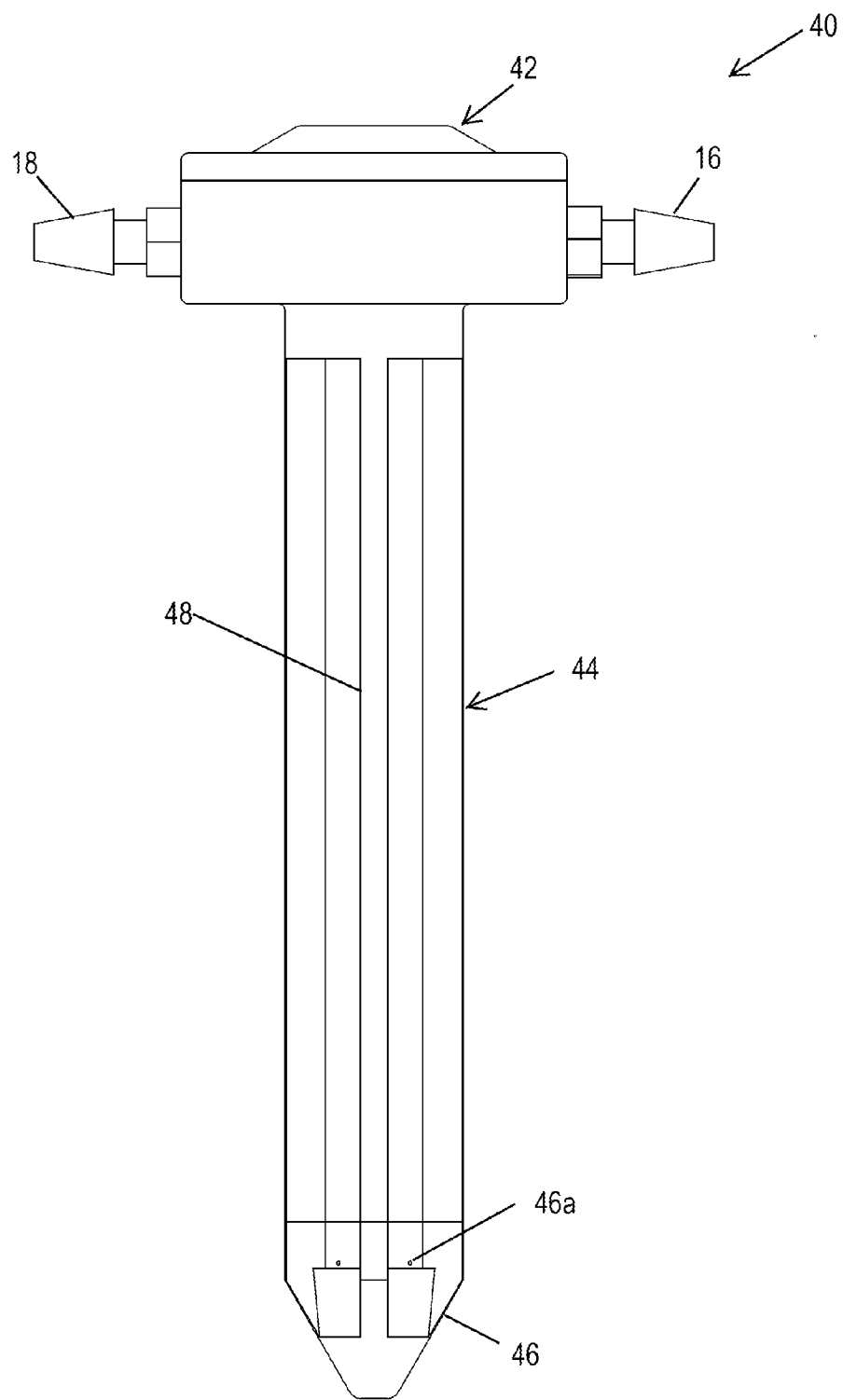
FIG. 7 is a side elevation view of a spike style drip emitter in accordance with a second embodiment of the present invention.
Figure 11:
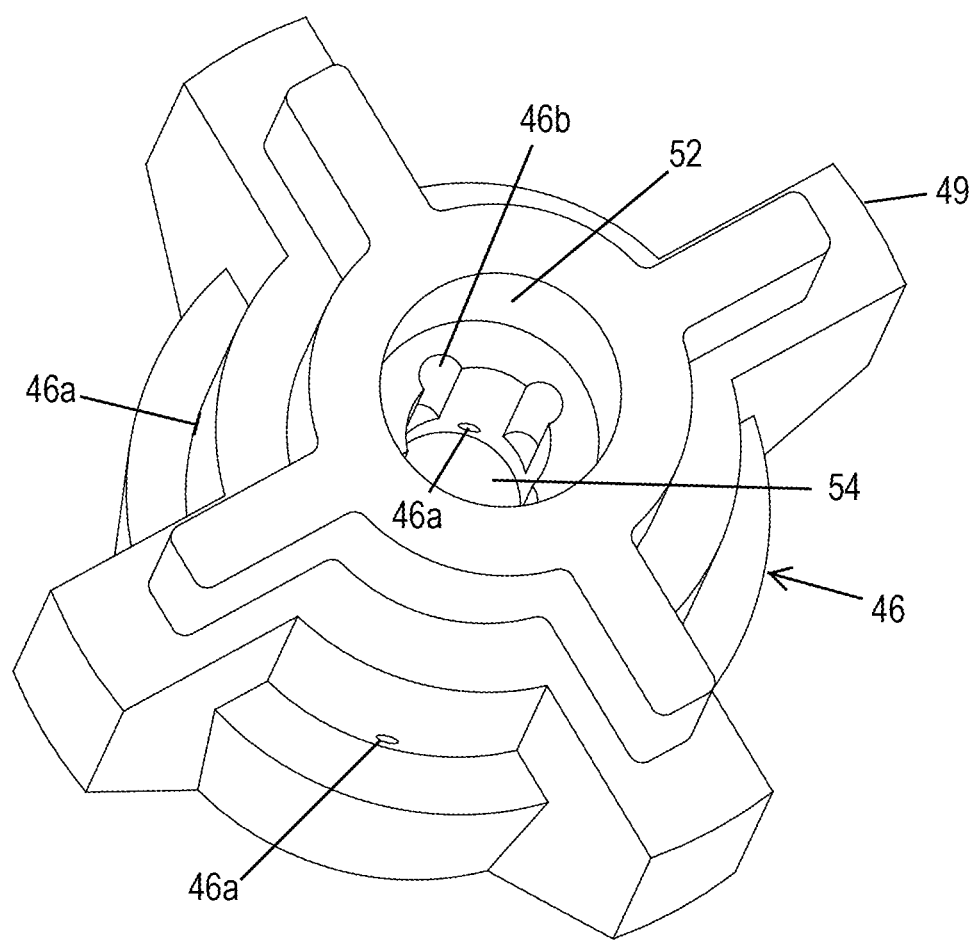
FIG. 11 is an enlarged isometric view of the conical tip of the spike style drip emitter of FIG. 7 taken from above.

FIG. 7 illustrates a spike style drip emitter 40 in accordance with a second embodiment of the present invention. The drip emitter 40 has a valve portion 42 similar to the button style drip emitter 10 except that the lower nipple portion 12d is replaced with an elongated lower ground spike portion 44. The drip emitter 40 is configured so that the lower pointed end 46 of the ground spike portion 44 can be manually pushed into the soil to anchor the emitter 40 with the valve portion 42 located above ground. The spike portion 44 is formed with four elongated vertical ribs 48 that are spaced ninety degrees apart. The lower pointed end 46 is similarly formed with four elongated vertical ribs 49 (FIG. 11). This cross configuration of the spike portion 44 provides sufficient rigidity and reduced cross-sectional area to ease the insertion of the spike portion 44 into the soil.

Figure 8:
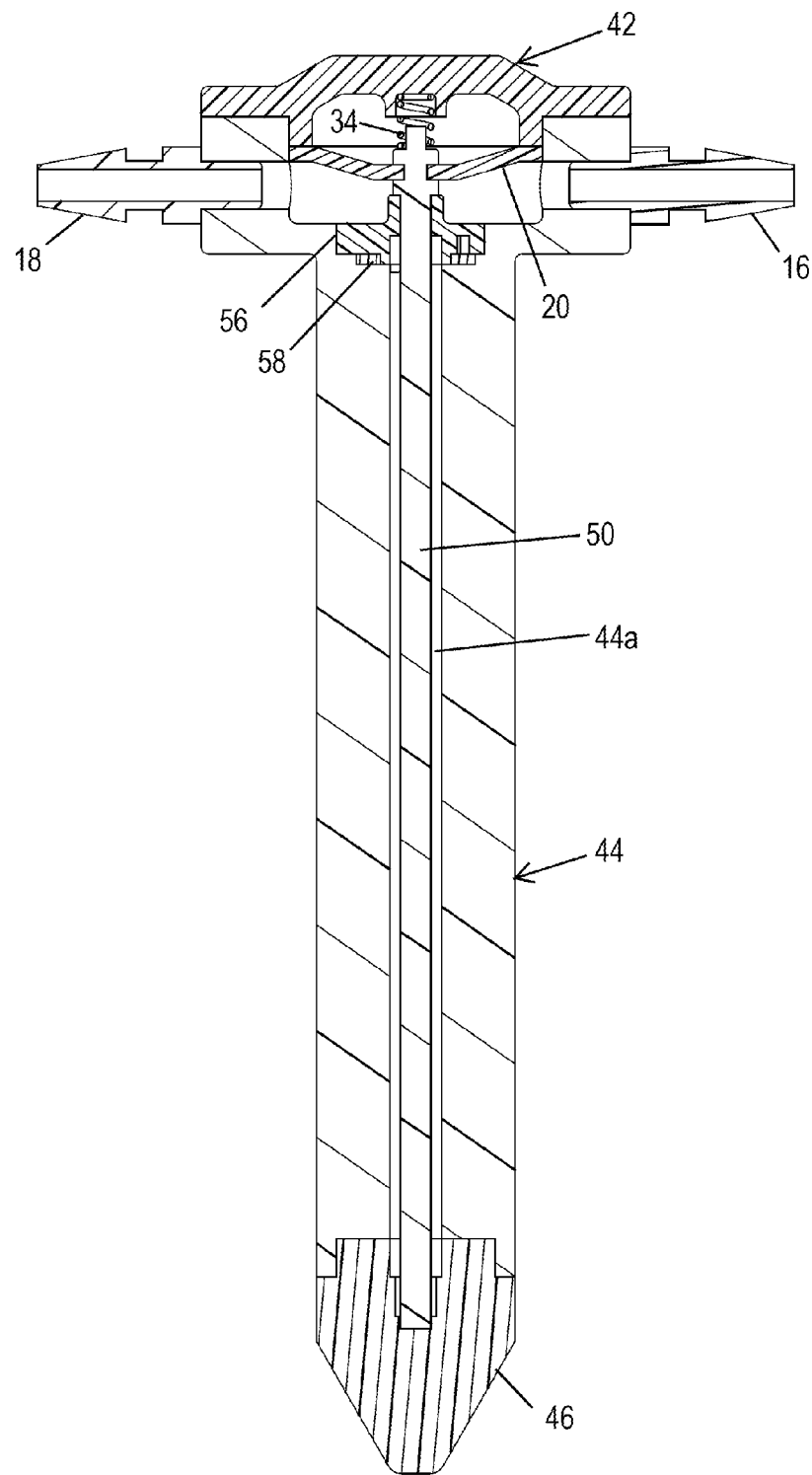
FIG. 8 is vertical sectional view illustrating the spike style drip emitter of FIG. 7 in its CLOSED state.
Figure 9:
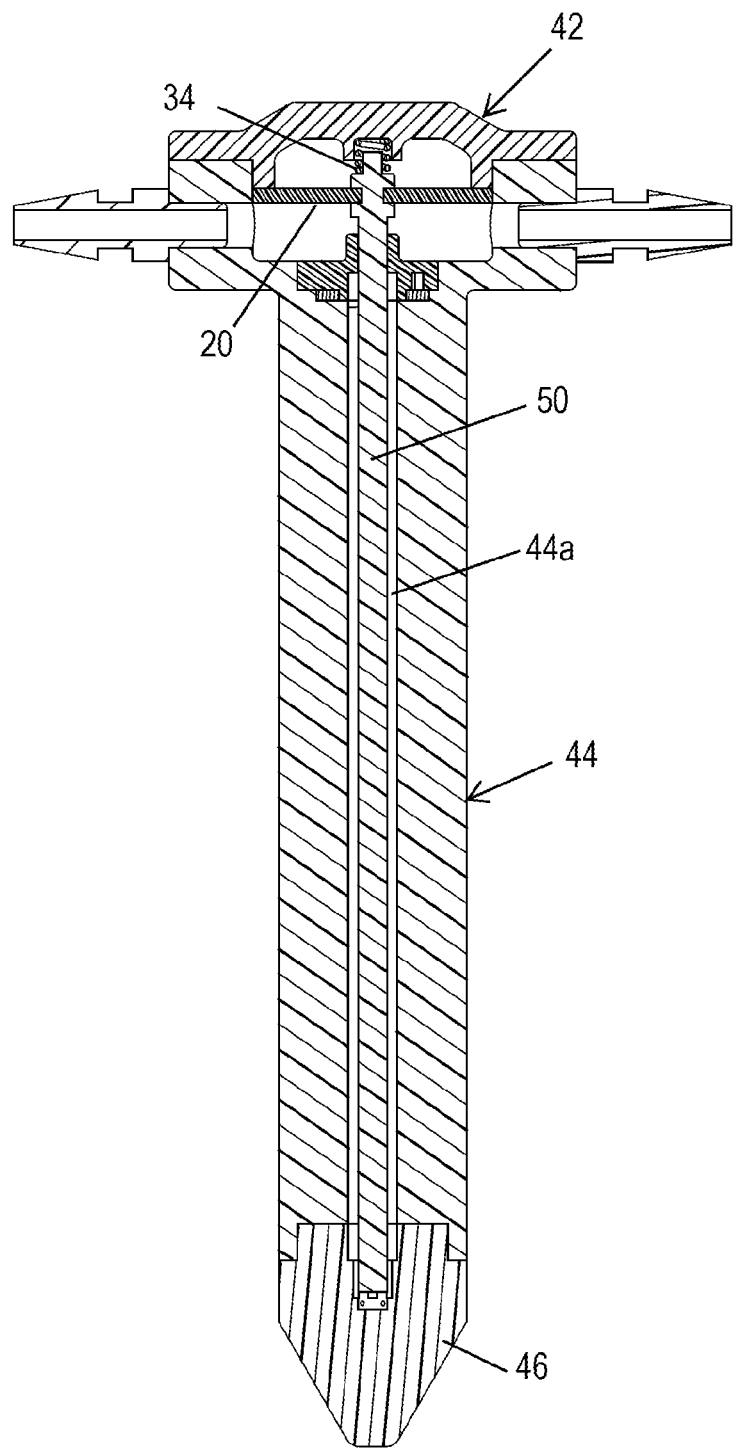
FIG. 9 is view similar to FIG. 8 illustrating the spike style drip emitter of FIG. 7 in its OPEN state.

A greatly elongated pin 50 (FIG. 8) performs a similar function in the drip emitter 40 as the pin 32 performs in the drip emitter 10. The upper end of the pin 50 has a similar configuration like that of the upper end of the pin 32 to allow it to be connected to the center of the diaphragm 20. The pin 50 extends through a long central bore 44a in the spike portion 44. The outer diameter of the pin 50 is less than the inner diameter of the bore 44a, thereby creating a water flow passage through the spike portion 44. Water exiting the base 30 flows through the bore 44a to the lower pointed end 46 of the ground spike portion 44. The lower pointed end 46 of the ground spike portion 44 is formed with four small radially extending exit ports 46a (FIG. 11). The lower pointed end 46 is formed with an upper larger central bore 52 and a lower smaller central bore 54. The central bore 52 in the lower pointed end 46 has the same diameter as the bore 48 through the spike portion 44 and forms an extension thereof. The lower smaller central bore 54 in the lower pointed end 46 has a diameter slightly larger than the outer diameter of the pin 50. The lower pointed end 46 is formed with four axially extending arcuate recesses 46b that open into the smaller central bore 54. When pressurized water is supplied to the drip emitter 40 via the barbed fitting 16, the drip emitter 40 assumes its OPEN state illustrated in FIG. 9. The pressurized water flattens the diaphragm 20, raising the pin 50. The lower end of the pin 50 is withdrawn from the smaller central bore 54 and unseals the exit ports 46a. Water flows through the recesses 46b and is emitted from the spike portion 44 into the surrounding soil. When the source of pressurized water to the drip emitter 40 is turned OFF, the drip emitter 40 assumes its CLOSED state as illustrated in FIG. 8. The coil spring pushes the diaphragm 20 and the pin 50 downwardly. The lower end of the pin 50 descends into the smaller central bore 54 sealing the exit ports 46a from the inside.

Figure 10:
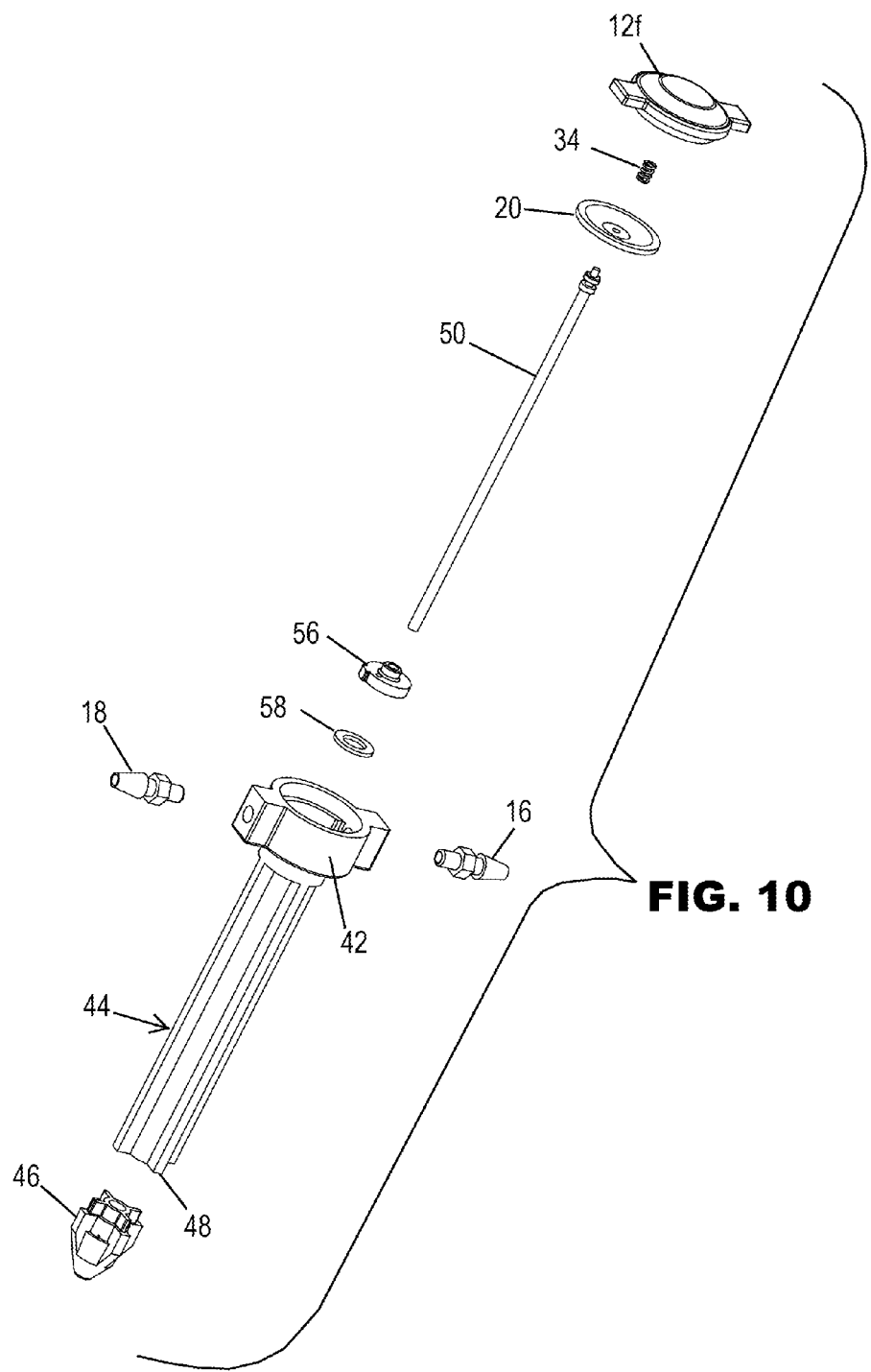
FIG. 10 is a reduced exploded isometric view of the spike style drip emitter of FIG. 7.
Figure 12:
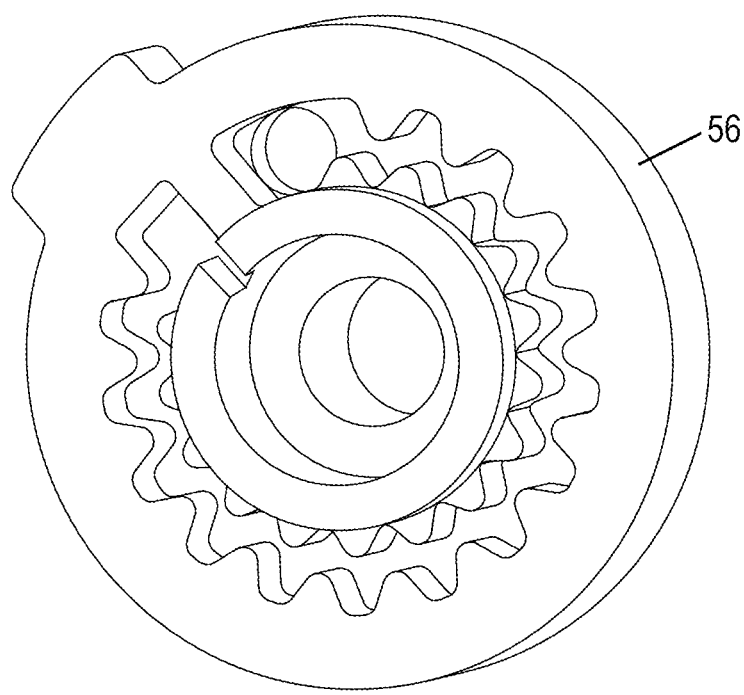
FIG. 12 is an enlarged isometric view of the tortuous path disc of the spike style drip emitter of FIG. 7 taken from above.

The emitter 40 utilizes a flow control disc 56 (FIGS. 10 and 12) and washer 58 with different configurations than the flow control disc 22 and washer 31 utilized in the drip emitter 10. These different configurations facilitate the accommodation of the spike portion 44 in lieu of the lower nipple portion 12d.

Figure 13:
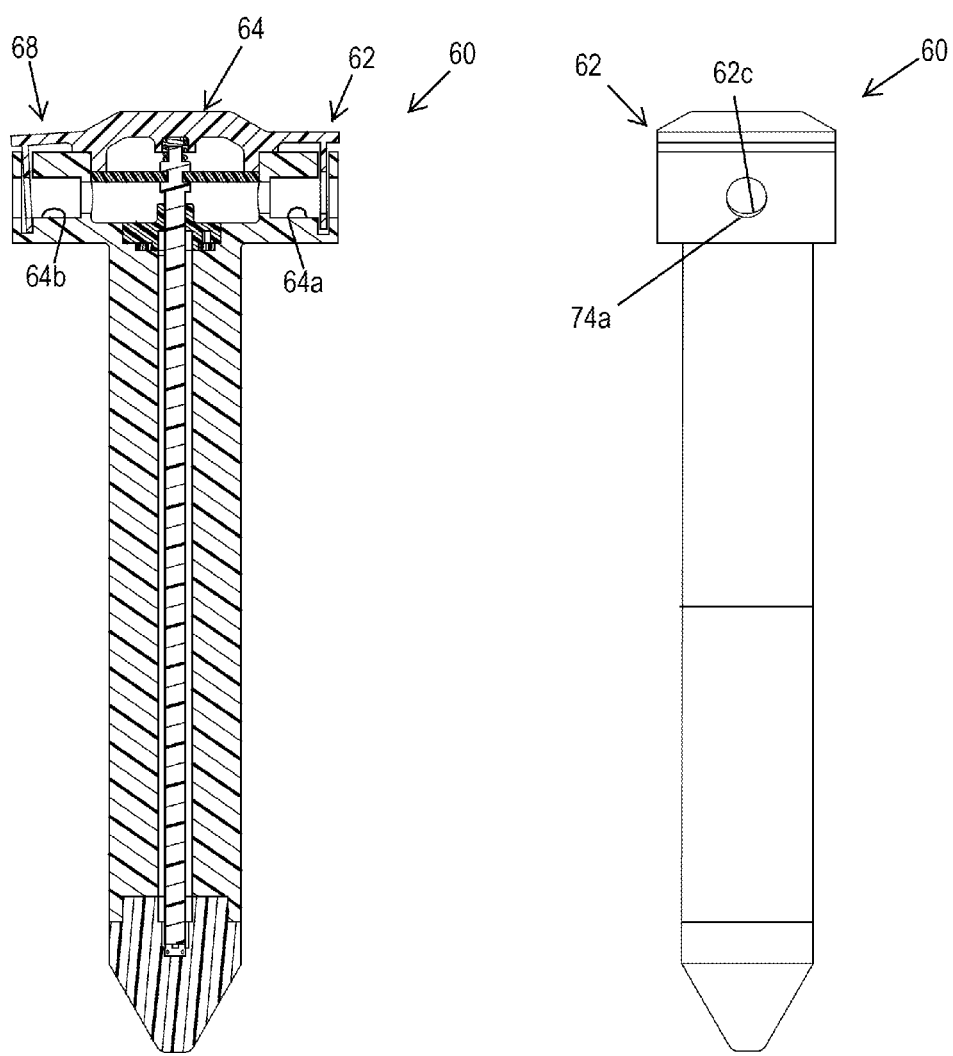
FIG. 13A is a vertical sectional view illustrating details of a spike style drip emitter with quick connect mechanisms for coupling drip line tubing to the drip emitter in accordance with a third embodiment of the present invention.
FIG. 13B is a side elevation view of the spike style drip emitter of FIG. 13A rotated ninety degrees from the orientation illustrated in FIG. 13A.

FIG. 13A illustrates a third embodiment of the present invention in the form of a spike style drip emitter 60 with quick connect mechanisms for coupling drip line tubing to the drip emitter 60. The drip emitter 60 is generally similar in construction to the drip emitter 40 except for the utilization of the quick connect mechanisms in place of the barbed fittings 16 and 18. A first clamp fitting 62 is provided on an inlet side of a valve chamber 64 for coupling a first tube segment 66 (FIG. 15) to admit water from the first tube segment 66 through an entry port 64a (FIG. 13A). A second clamp 68 fitting (FIG. 13A) is provided on an outlet side of the valve chamber 64 for coupling a second tube segment 70 (FIG. 15) to deliver water from the hollow interior of the valve chamber 64 through an exit port 64b (FIGS. 13A and 13B) and into the second tube segment 70.

Figure 14:
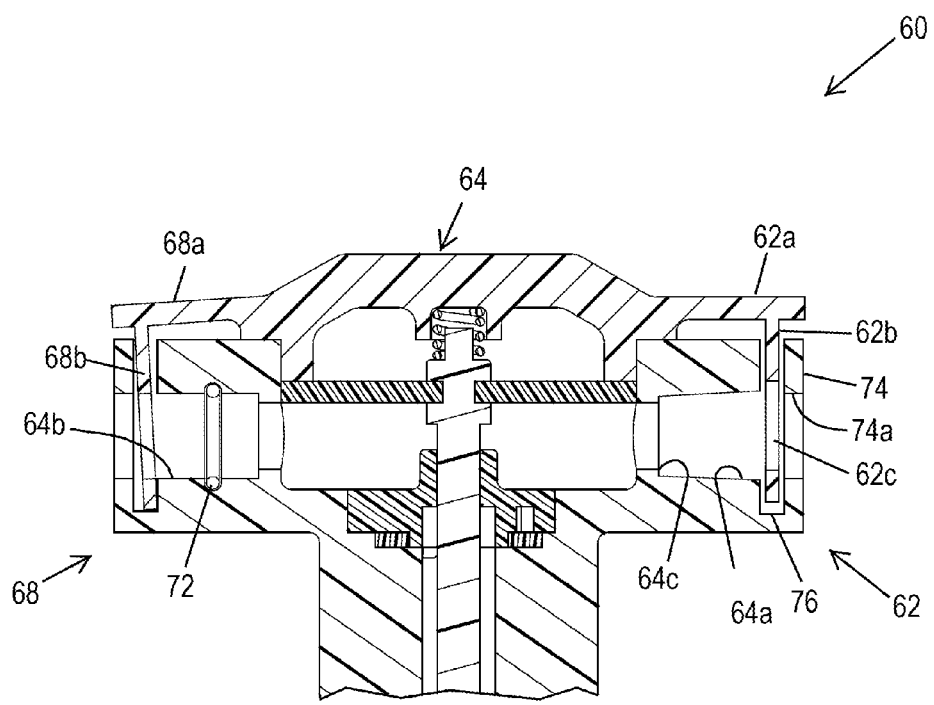
FIG. 14 is an enlarged portion of FIG. 13A illustrating further details of the quick connect mechanisms of the spike style drip emitter of FIG. 13A.

FIG. 14 illustrates two different tube segment coupling configurations on opposite sides of the drip emitter 60 for the sake of expediency. A commercial version of the drip emitter 60 would use the same configuration on both sides as illustrated in FIG. 13A. On the right side of the drip emitter 60 the entry port 64a is tapered in FIG. 14. On the left side of the drip emitter 60 the exit port 64b is straight in FIG. 14, i.e. non-tapered. An O-ring 72 is seated in a groove formed in wall of the exit port 64b intermediate its length.

Figure 15:
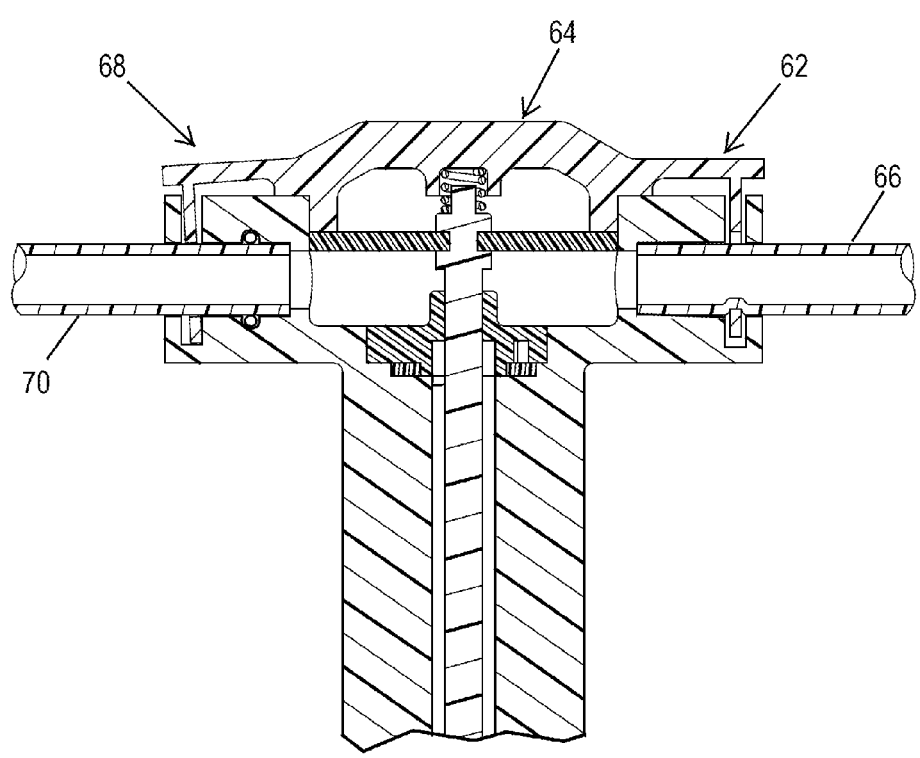
FIG. 15 is a view similar to FIG. 14 illustrating two segments of drip line tubing inserted in the spike style drip emitter of FIG. 13A.

The first clamp fitting 62 (FIG. 14) includes a resilient planar finger 62a which has a planar locking member 62b connected to the free end thereof. The inner end of the finger 62a is connected to the valve chamber 64. The locking member 62b extends at a right angle relative to the finger 62a. Preferably, the finger 62a and the locking member 62b are integrally molded with the valve chamber 64. The locking member 62b has a round hole 62c formed in the middle that is slightly larger in diameter than the outside diameter of the first tube segment 66. The hole 62c is located so that it is slightly above, and not centered with, a round hole 74a of similar diameter formed in a vertical planar wall 74 formed on one side of the valve chamber 64. The first tube segment 66 can be quickly coupled to the drip emitter 60 by manually pressing down on the outer end of the finger 62a to bend it downward slightly. When the lower end of the locking member 62b abuts the bottom of a groove 76 formed in the valve chamber 64, the hole 62c in the locking member 62b will be aligned with a hole 74a of similar diameter formed in a vertical planar wall 74 formed on the outside of the valve chamber 64. This allows the end of the first tube segment 66 to be inserted into the valve chamber 64 through the aligned holes 74a and 62c until the end of the first tube segment 66 abuts a vertical shoulder 64c of the entry port 64a. When the finger 62a is manually released it returns to its normal horizontal orientation due to the resiliency of its plastic construction, clamping the first tube segment 66 and securely holding the first tube segment 66 in the valve chamber 64 as illustrated in FIG. 15. The end of the first tube segment 66 is slightly deformed by the taper of the entry port 64a. The combination of the narrowing of the entry port 64a and the clamping force of the finger 62a ensures that there is a water tight seal between the first tube segment 66 and the valve chamber 64.

The second clamp fitting 68 (FIG. 14) similarly includes a resilient planar finger 68a which has a planar locking member 68b connected to the free end thereof. The construction and operation of the second clamp fitting 68 is similar to that of the first clamp fitting 62 except that the former has the straight exit port 64b and utilizes the O-ring 72 to provide the water tight seal. FIG. 14 illustrates the locking member 68b in its lowered position. FIG. 15 illustrates the locking member 68b in its lowered position illustrating the alignment when inserting the second tube segment 70 in place in the valve chamber 64.

While several embodiments of a subsurface drip emitter with an exit closure mechanism have been described and illustrated in detail, it will be apparent to those skilled in the art that the present invention can be modified in both arrangement and detail. For example, the button style emitter could be provide with quick connect mechanisms for coupling drip line tubing to the button style emitter. The emitter may be formed without the second output port that delivers water from the hollow interior to a second tube segment. The input port may be formed on any surface that communicates with the hollow interior. The coil spring could be replaced with a different type of spring such as a leaf spring or spring washer. Each of the disclosed embodiments could be provided with an integrated pressure regulator. The quick connect mechanisms can be used in any drip emitter or other low volume emitter for coupling drip line tubing. Therefore, the protection afforded the invention should only be limited in accordance with the following claims.

What is claimed is:

1. A drip emitter for landscape irrigation, comprising:
   a valve chamber defining a hollow interior, an entry port, at least one exit port, and a tortuous path water flow channel that limits the flow of water from the entry port to the at least one exit port;
   a flexible diaphragm mounted in the hollow interior of the valve chamber for movement in response to pressurized water being supplied to the hollow interior through the entry port;
   a closure member positioned between the tortuous path water flow channel and the at least one exit port, the closure member moved by the flexible diaphragm to open the at least one exit port when pressurized water enters the hollow interior to allow water to be discharged through the at least one exit port; and
   a spring that moves the closure member to close the at least one exit port when the supply of pressurized water is shut OFF;
   wherein the at least one exit port defines an interface between the hollow interior of the valve chamber and an environment surrounding the drip emitter.

2. The drip emitter of claim 1 wherein the entry port is formed on a first wall of the valve chamber, and a first exit port that is closed by the closure member is formed in a second wall of the valve chamber.

3. The drip emitter of claim 1 and further comprising a first barbed fitting for coupling a first tube segment to admit water from the first tube segment through the entry port and a second barbed fitting for coupling a second tube segment to deliver water from the hollow interior through a second exit port and into the second tube segment.

4. The drip emitter of claim 1 and further comprising a first clamp fitting on the valve chamber for coupling a first tube segment to admit water from the first tube segment through the entry port.

5. The drip emitter of claim 4 and further comprising a second clamp fitting on the valve chamber for coupling a second tube segment to deliver water from the hollow interior through the second exit port and into the second tube segment.

6. The drip emitter of claim 1 wherein the at least one exit port is formed in the lower end of a ground spike portion extending from the valve housing.

7. The drip emitter of claim 1 wherein the closure member is a pin.

8. The drip emitter of claim 6 wherein the lower end of the ground spike portion is formed with a plurality of exit ports.

9. The drip emitter of claim 1 wherein the spring is a coil spring.

10. A drip emitter for irrigation, comprising:
    a valve chamber defining a hollow interior, an entry port and at least one exit port;
    a flexible diaphragm mounted in the hollow interior of the valve chamber for movement from a first configuration to a second configuration in response to pressurized water being supplied to the hollow interior through the entry port;
    a flow control disc mounted in the valve chamber having a tortuous path water flow channel that limits the flow of water from the hollow interior of the valve chamber to the at least one exit port; and
    a closure member moved by the flexible diaphragm to open the at least one exit port when pressurized water enters the hollow interior to allow water to be discharged through the at least one exit port, the closure member configured to seal the at least one exit port to inhibit ingress of material through the at least one exit port into the hollow interior of the valve chamber when the flexible diaphragm is in the first configuration.

11. The drip emitter of claim 10 and further comprising a spring that moves the closure member to close the at least one exit port when the supply of pressurized water is shut OFF.

12. The drip emitter of claim 10 wherein the entry port is formed on a side wall of the valve chamber, a first exit port that is closed by the closure member is formed in a bottom wall of the valve chamber, and a second exit port is formed on the side wall of the chamber.

13. The drip emitter of claim 12 and further comprising a first barbed fitting for coupling a first tube segment to admit water from the first tube segment through the entry port and a second barbed fitting for coupling a second tube segment to deliver water from the hollow interior through the second exit port and into the second tube segment.

14. The drip emitter of claim 10 and further comprising a first clamp fitting on the valve chamber for coupling a first tube segment to admit water from the first tube segment through the entry port.

15. The drip emitter of claim 14 wherein the first clamp fitting includes a resilient locking finger with a locking member connected to a free end thereof and having a first hole for receiving the first tube segment therethrough, the first clamp fitting further including a fixed wall with a second hole for receiving the first tube segment therethrough, the first and second holes being aligned by pressing down on the free end of the locking finger, and the locking finger returning to a normal orientation when manually released in which the locking member clamps the first tube segment in place relative to the valve chamber.

16. The drip emitter of claim 15 wherein the entry port is tapered.

17. The drip emitter of claim 15 wherein the entry port is non-tapered.

18. The drip emitter of claim 17 and further comprising at least one O-ring mounted in the entry port.

19. A low flow irrigation device for connection to a segment of drip line tube, comprising:
    a valve chamber defining a hollow interior, an entry port and at least one exit port;
    a diaphragm mounted in the hollow interior of the valve chamber for movement in response to pressurized water being supplied to the hollow interior through the entry port;
    a flow limiter in the valve chamber that limits the flow of water from the hollow interior of the valve chamber to the at least one exit port;
    a closure member moved by the diaphragm to open the at least one exit port when pressurized water enters the hollow interior to allow water to be discharged through the at least one exit port;
    a spring that moves the closure member to close the at least one exit port when the supply of pressurized water is shut OFF; and
    a clamp fitting that allows a segment of tube to be coupled to the entry port, the clamp fitting including a resilient locking finger with a locking member connected to a free end thereof and having a first hole for receiving the tube segment therethrough, the first clamp fitting further including a fixed wall with a second hole for receiving the tube segment therethrough, the first and second holes being aligned by pressing down on the free end of the locking finger, and the locking finger returning to a normal orientation when manually released in which the locking member clamps the tube segment in place relative to the valve chamber.

20. A drip emitter for irrigation, comprising:
a valve chamber defining a hollow interior, an entry port and at least one exit port;
a flexible diaphragm mounted in the hollow interior of the valve chamber for movement from a first configuration to a second configuration in response to pressurized water being supplied to the hollow interior through the entry port;
a flow control disc mounted in the valve chamber having a tortuous path water flow channel that limits the flow of water from the hollow interior of the valve chamber to the at least one exit port;
a first clamp fitting on the valve chamber for coupling a first tube segment to admit water from the first tube segment through the entry port, wherein the first clamp fitting includes a resilient locking finger with a locking member connected to a free end thereof and having a first hole for receiving the first tube segment therethrough, the first clamp fitting further including a fixed wall with a second hole for receiving the first tube segment therethrough, the first and second holes being aligned by pressing down on the free end of the locking finger, and the locking finger returning to a normal orientation when manually released in which the locking member clamps the first tube segment in place relative to the valve chamber; and
a closure member moved by the flexible diaphragm to open the at least one exit port when pressurized water enters the hollow interior to allow water to be discharged through the at least one exit port, the closure member configured to seal the at least one exit port to inhibit ingress of material through the at least one exit port into the hollow interior of the valve chamber when the flexible diaphragm is in the first configuration.

* * * * *